May 9, 1933.                F. M. GREGG ET AL                1,908,142
PROCESS AND MEANS FOR UNDERCUTTING AND SEALING LAMINATED GLASS OR THE LIKE
Filed May 2, 1931
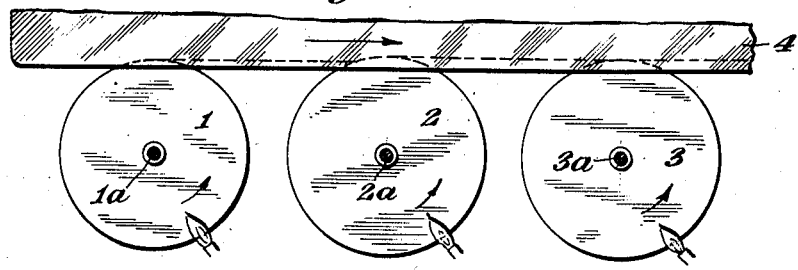
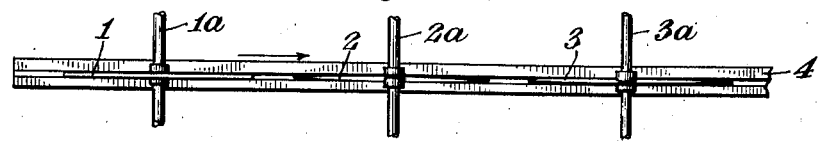
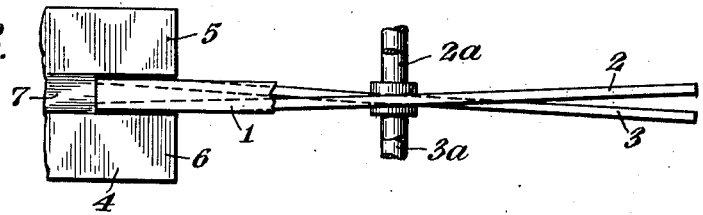
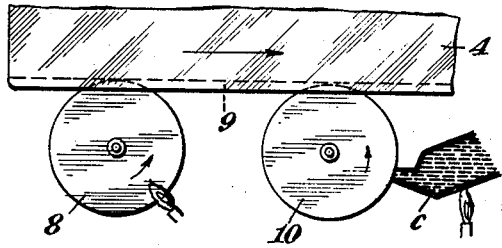
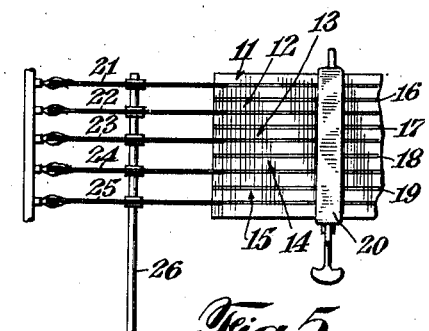
INVENTORS
FRANK M. GREGG.
FURMAN N. CAMPBELL.
BY JULES MYATT.
Ward, Crosby & Neal
ATTORNEYS Patented May 9, 1933

1,908,142

UNITED STATES PATENT OFFICE

FRANK M. GREGG, FURMAN N. CAMPBELL AND JULES MYATT, OF EAST HAVEN, CONNECTICUT, ASSIGNORS TO BESSIE L. GREGG, OF EAST HAVEN, CONNECTICUT

PROCESS AND MEANS FOR UNDERCUTTING AND SEALING LAMINATED GLASS OR THE LIKE

Application filed May 2, 1931. Serial No. 534,570.

This invention relates to methods and apparatus for undercutting and sealing the edges of laminated glass comprising a plurality of glass layers separated by a layer of nitro-cellulose or other shatter preventing binding material.

In laminated glass, in order to protect the edges of the binding material to prevent admission of moisture or any other deteriorating agents it is desirable to apply to the edges some form of waterproofing or sealing material. It has been found that in order to make the waterproofing or sealing material adhere permanently it is desirable to remove a narrow strip of the binding material from between the edges of the glass laminations so that the sealing material may be readily applied in the groove thus formed between the glass edges.

Among the objects of this invention are the method and apparatus for removing a narrow strip of the binding material from between the edges of the glass laminations at a rapid rate, and to leave the groove thus formed clean of the sealing material and of any gelatinous or other material that may have been used to cause the layer of nitrocellulose to adhere to the glass.

Other objects of this invention relate to the method and apparatus for preheating the groove so that the sealing material, which is preferably applied while hot, will flow into close contact with the walls of the groove constituted by the inner surfaces of the edges of the glass laminations and the surface of the edge of the layer of nitrocellulose.

Still other objects of this invention relate to the method of and apparatus for undercutting the laminated glass to provide a clean groove, and for heating the groove prior to the application of the sealing material.

Still other objects of this invention relate to the method of and apparatus for performing the undercutting and sealing operations simultaneously upon a plurality of sheets of laminated glass.

Various other and more specific objects, features and advantages will more clearly appear from the detailed description taken in connection with the accompanying drawing, in which Fig. 1 is a top plan view showing diagrammatically the improved undercutting mechanism;

Fig. 2 is an edge view of said mechanism operating upon one sheet of laminated glass;

Fig. 3 is an end view of Fig. 2 looking toward the right;

Fig. 4 is a top plan view of the preheating and sealing mechanism; and

Fig. 5 is a view showing mechanism for simultaneously operating on the corresponding edges of a plurality of superimposed sheets of laminated glass.

In our application, Ser. No. 435,437, filed March 13, 1930, for "Sealing means and process and apparatus for applying same to the edges of laminated glass or the like", there is disclosed an undercutting disk which is mounted at an angle to its supporting shaft so that its cutting and burning edge will travel between the opposed surfaces on the edges of the glass laminations to remove the layer of nitro-cellulose binding material between the glass laminations. This disk is preferably heated in any suitable manner to the proper temperature.

In order to speed up the operation of undercutting, according to this invention, we employ three disks, 1, 2 and 3, arranged in tandem as indicated in Figures 1, 2 and 3. All of these disks are heated by any suitable means, gas flames having been shown as the heating means for purposes of disclosure of this invention. The disks are preferably mounted on shafts 1a, 2a and 3a which are parallel to each other and lie in the same plane. As shown in Figs. 1, 2 and 3, the disk 1 is preferably of a smaller diameter than the disks 2 and 3 and is of a width slightly less than the thickness of the layer of binding material. The disks 2 and 3 are preferably relatively thin as indicated.

As indicated by the arrows in Figs. 1 and 2, the first part of the cutting operation is performed by the disk 1 which removes most of the edge of the layer of binding material between the edges of the glass laminations. It has been found desirable to make this disk of a slightly smaller diameter than the disks 2 and 3, as indicated in Figs. 1 and 3, the disk 1 functioning to roughly undercut the laminated glass and the disks 2 and 3 operating to finish the cutting operation.

As shown in Figs. 1 and 2, the laminated sheet of glass 4 is shown as traveling from the left to the right with respect to the disks 1, 2 and 3. This operation may be performed by any suitable mechanism not shown or, if desired, disks 1, 2 and 3 may be mounted to travel from right to left with respect to the sheet of laminated glass.

As in the application referred to, the disks 2 and 3 are preferably mounted angularly on their shafts so that the portion that burns away the binding material travels or wobbles between the opposed surfaces of the edges of the layers of glass 5 and 6 to cut out the layer of binding material 7, as is well understood. These disks 2 and 3 are preferably angularly related to each other as indicated more particularly in Figs. 2 and 3.

By means of this construction it is possible to accordingly speed up the operation of undercutting and to provide a substantially clean and uniform groove in the edge of the laminated glass.

As shown in Fig. 4, the walls of the groove may be preheated by means of a disk 8 which may be heated in any suitable manner as by a gas flame, as shown. The temperature of the disk 8 is preferably high enough to heat the groove to the required temperature but not hot enough to cause the binding material to burn or the glass layers to crack. As the sheet of laminated glass is moved to the right it passes over the disk 8 to heat the grooved edge 9 and while the groove is still heated any suitable kind of heated sealing material in a container C is applied in the groove by means of the disk 10, as indicated diagrammatically in Fig. 4. As the side walls and the bottom of the groove are heated at the time the sealing material is applied the sealing material will flow into close contact with the glass as well as with the edge of the sealing material, thus preventing the trapping of air between the sealing material and the binding material which has been found to result in a silver streak showing between the edge of the layer of binding material and the inner edge or bottom of the sealing material.

In order to further speed up the operation of treating laminated glass, as shown in Fig. 5, we superimpose a plurality of sheets of laminated glass as indicated at 11, 12, 13, 14 and 15, such sheets being preferably separated by layers of soft material such as felt indicated at 16, 17, 18 and 19. The corresponding edges of the laminated sheets which are to be treated first are aligned vertically, as shown in Fig. 5, and are preferably held in this position by a clamp or clamps 20 which may be passed over the front and rear edges of the sheets of laminated glass. For the purpose of operating on a plurality of sheets of glass at one time, the disks that perform the same function on the several sheets of glass are, as indicated in Fig. 5 at 21, 22, 23, 24 and 25, preferably mounted on a common vertical shaft 26 in order to simplify the mechanism and to obtain uniform operation of the several disks upon the respective sheets of laminated glass.

While the invention has been described with particularity in respect to certain preferred steps and embodiments, it will be understood by those skilled in the art after understanding the invention, that various changes and modifications may be made without departing from the spirit and scope of the invention and it is intended therefore in the appended claims to cover all such changes and modifications.

What we claim is:

1. A step in the process of treating laminated glass comprising plates of glass and an interposed layer of transparent material defining in connection with said plates a groove, which consists in heating the walls of the groove in which sealing material is to be applied and then applying the sealing material while said walls are still heated.

2. A step in the process of treating laminated glass provided with a grooved edge, which consists in raising the temperature of the grooved edge above normal outside temperature and then in applying in said groove sealing material raised to a temperature above normal outside temperature.

3. A step in the process of treating laminated glass comprising a pair of plates of glass and an interposed layer of transparent material of smaller dimension providing with the plates of glass a groove along the edge of the laminated glass, which consists in heating the edge of the interposed layer and then applying heated sealing material on to said edge while the edge is still hot.

4. The combination of a heated element operable in a groove in the edge of laminated glass for raising the temperature thereof and means for subsequently applying sealing material in said preheated groove.

5. The combination of a preheating disk operable in a groove in the edge of laminated glass, and a disk also operable in said groove for applying heated sealing material in said groove while the groove is still hot.

6. The combination of angularly related disks for cutting out the edge of material interposed between plates of glass constituting laminated glass, one of said disks operating on said material in the plane of said material and the other on said material at an angle to said plane, a heated disk operable in the groove formed by said cutting disks for preheating said groove, and a sealing device operable to apply heated sealing material in said groove.

In testimony whereof we have signed our names to this specification.

FRANK M. GREGG.
FURMAN N. CAMPBELL.
JULES MYATT.